United States Patent
Terui

(10) Patent No.: US 7,653,411 B2
(45) Date of Patent: Jan. 26, 2010

(54) ELECTRONIC APPARATUS HAVING INFRARED COMMUNICATION FUNCTION

(75) Inventor: Natsuko Terui, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 603 days.

(21) Appl. No.: 11/441,066

(22) Filed: May 26, 2006

(65) Prior Publication Data

US 2007/0190936 A1    Aug. 16, 2007

(30) Foreign Application Priority Data

Feb. 15, 2006    (JP)    ............... 2006-038300

(51) Int. Cl.
    *H04M 1/00*    (2006.01)
(52) U.S. Cl. ............... 455/550.1; 455/412.1; 455/414.1; 455/419; 455/566; 455/418; 455/557; 340/425.1; 340/995.12; 379/56.1; 379/56.3
(58) Field of Classification Search ............. 455/550.1, 455/557, 418, 558, 412.1, 414.1, 419, 566; 340/425.1, 995.12; 379/56.3, 56.1
    See application file for complete search history.

(56) References Cited

U.S. PATENT DOCUMENTS

| | | | | |
|---|---|---|---|---|
| 5,835,862 A | * | 11/1998 | Nykanen et al. ............ 455/558 |
| 5,940,767 A | * | 8/1999 | Bourgeois et al. .......... 455/466 |
| 6,282,433 B1 | * | 8/2001 | Holshouser .............. 455/556.2 |
| 6,285,890 B1 | * | 9/2001 | Panian ..................... 455/557 |
| 6,570,689 B1 | | 5/2003 | Kushita |
| 6,615,057 B1 | * | 9/2003 | Pettersson ................. 455/558 |
| 6,633,759 B1 | * | 10/2003 | Kobayashi ................. 455/419 |
| 6,671,508 B1 | * | 12/2003 | Mitsuoka et al. ......... 455/412.1 |
| 7,047,027 B2 | * | 5/2006 | Jeon ....................... 455/466 |
| 7,106,466 B2 | * | 9/2006 | Takaoka ................... 358/1.15 |
| 7,177,928 B2 | * | 2/2007 | Sasaki et al. ............... 709/224 |
| 7,206,559 B2 | * | 4/2007 | Meade, II ................ 455/151.1 |
| 7,215,881 B2 | * | 5/2007 | Borngraber et al. ........... 396/15 |
| 7,221,959 B2 | * | 5/2007 | Lindqvist et al. ......... 455/552.1 |
| 7,366,527 B2 | * | 4/2008 | Jhuang ..................... 455/458 |
| 7,443,283 B2 | * | 10/2008 | Schmandt et al. ......... 340/407.1 |
| 7,444,147 B2 | * | 10/2008 | Lloyd ....................... 455/434 |
| 7,486,970 B2 | * | 2/2009 | Kim et al. .................. 455/566 |
| 2003/0073432 A1 | * | 4/2003 | Meade, II ................... 455/420 |

FOREIGN PATENT DOCUMENTS

JP    2000-91980    3/2000

* cited by examiner

*Primary Examiner*—Marceau Milord
(74) *Attorney, Agent, or Firm*—Westerman, Hattori, Daniels & Adrian, LLP

(57) ABSTRACT

The infrared communication unit of the mobile phone receives a first data series transmitted from the other-party mobile phone by infrared communication, and, when transmitting a second data series by infrared communication, the controller of the mobile phone controls the infrared communication unit so as to transmit the second data series in response to completion of reception of the first data series. Alternatively, the controller controls the infrared communication unit so as to receive the first data series in response to completion of transmission of the second data series.

3 Claims, 3 Drawing Sheets

(a)

(b)

(c)

(d)

(e)

ELECTRONIC APPARATUS HAVING INFRARED COMMUNICATION FUNCTION

CROSS-REFERENCE TO RELATED APPLICATIONS

This application is based upon and claims the benefit of priority from the prior Japanese Patent Application No. 2006-38300, filed on Feb. 15, 2006, the entire contents of which are incorporated herein by reference.

BACKGROUND OF THE INVENTION

1. Field of the Invention

This invention relates to a mobile phone having an infrared communication function, and in particular relates to a mobile phone which is capable of automatically switching between transmission and reception when exchanging data between electronic terminals by means of infrared communication.

2. Description of the Related Art

Recent years have seen the appearance of mobile phones which adopt IrDA (Infrared Data Association) standards to perform data communication over short distances using infrared rays, and various services using the IrDA standard are beginning to be developed. By means of the IrDA standard, for example, data can be exchanged between mobile phones. IrDA is an industry organization established in 1993 in order to implement technical standards for data communication over short distances using infrared rays, and also refers to the standards for infrared communication introduced by that organization; at present, specifications include version 1.0 specifications, for communication distances of up to 1 meter and communication speeds up to 115.2 kbps; version 1.1 specifications, for communication distances within 1 meter and communication speeds up to 4 Mbps; and version 1.2 specifications (low-power consumption), for communication distances within 0.2 m and communication speeds up to 115.2 kbps.

When for example profile information (name of the user himself, telephone number, e-mail address, and other information) and address books (registered user telephone numbers, mail addresses and similar) stored in a mobile phone are to be exchanged between mobile phones, infrared communications using IrDA standards are employed. First, user A on the initial transmission side selects data for transmission, and sets his mobile phone to transmission mode. At this time, user B on the initial reception side sets his mobile phone to reception mode. When user A on the initial transmission side performs a transmission operation, data is transmitted from the mobile phone of user A on the initial transmission side, and the transmitted data is received by the mobile phone of user B on the initial reception side.

Next, the initial transmission side and initial reception side are switched, and the same operation is repeated. That is, the initial transmission side becomes the reception side, and the initial reception side becomes the transmission side. Specifically, after receiving data from the mobile phone of user A on the initial transmission side, user B on the initial reception side, which has become the transition side, selects data for transmission, and sets his mobile phone to transmission mode. On the other hand, after the end of data transmission, user A on the initial transmission side, which has become the reception side, sets his mobile phone to the reception mode. Then, when user B on the initial reception side performs a transmission operation, data is transmitted from the mobile phone of user B on the initial reception side, and the transmitted data is received by the mobile phone of user A on the initial transmission side.

When data is exchanged between mobile phones in this way using infrared communications, (1) after communication of the form user A transmission→user B reception, it is then necessary to perform (2) communication of the form user B transmission→user A reception, and in order to exchange data between users A and B the users must alternate between transmission and reception, so that two communication operations must be performed.

Japanese Patent Laid-open No. 2000-91980 discloses a mobile phone comprising an infrared communication function, which comprises communication mode switching means to switch the communication mode according to signals from the other-party system performing infrared communication.

As described above, in order to exchange data, user A performs an operation to transmit his own data, and after transmission is completed, performs an operation to receive data from user B. User B performs an operation to receive data from user A, and after reception is completed, must perform an operation to transmit his own data. That is, user operations are required once again during data exchange, so that some inconvenience is experienced in data exchange.

An object of this invention is to provide a mobile phone which, when performing data exchange between mobile phones using an infrared communication function, enables easier data exchange.

SUMMARY OF THE INVENTION

A first configuration of a mobile phone of this invention to attain the above object is a mobile phone having an infrared communication function, characterized in having an infrared communication unit which receives a first data series transmitted by infrared communication from the other-party mobile phone and transmits a second data series by infrared communication, and a controller which, in response to completion of reception of the first data series, controls the infrared communication unit so as to transmit the second data series.

A second configuration of a mobile phone of this invention is a mobile phone having an infrared communication function, characterized in having an infrared communication unit which receives a first data series transmitted by infrared communication from the other-party mobile phone and transmits a second data series by infrared communication, and a controller which, in response to completion of transmission of the second data series, controls the infrared communication unit so as to receive the first data series.

A third configuration of a mobile phone of this invention is characterized in having an infrared communication unit, which receives a first data series transmitted by infrared communication from the other-party mobile phone and transmits a second data series by infrared communication, and a controller which has a first mode of controlling the infrared communication unit so as to transmit the second data series in response to completion of reception of the first data series, and a second mode of controlling the infrared communication unit so as to receive the first data series.

By means of this invention, data exchange can be performed through a single operation for infrared communication, operations for data exchange can be simplified, and the time required for data exchange can be shortened.

DESCRIPTION OF THE PREFERRED EMBODIMENTS

Figure 1:
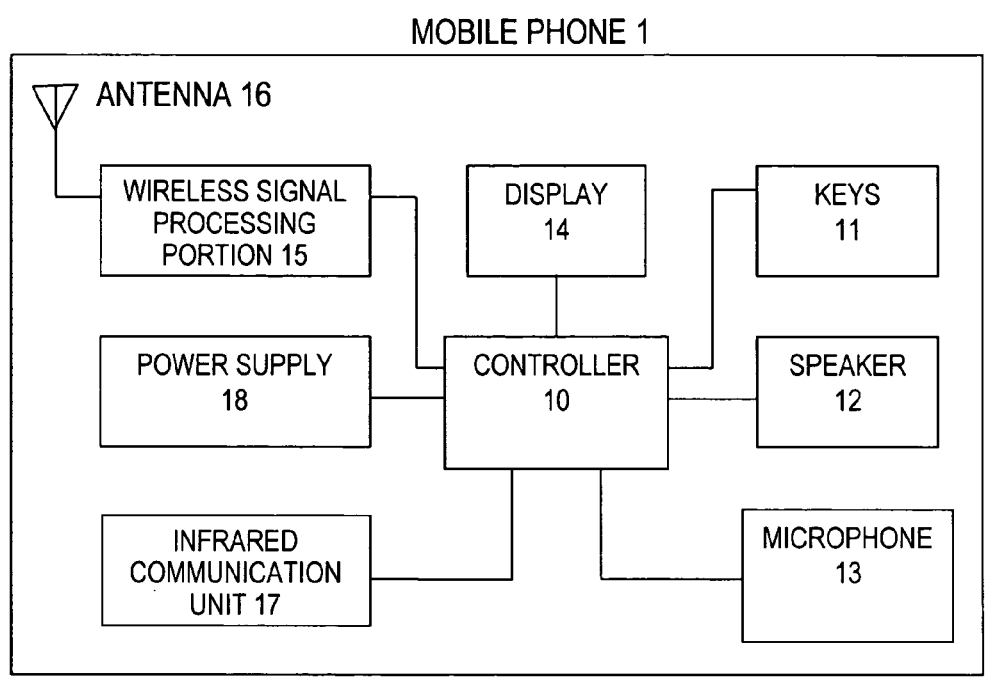
FIG. 1 shows a block diagram of the configuration of the mobile phone in an aspect of the invention.

Below, aspects of the invention are explained, referring to the drawings. However, the aspects in no way limit the technical scope of the invention.

In the aspects of the invention, mobile phones are explained as examples; but in addition to mobile phones, this invention can also be applied to PDAs, notebook personal computers, and other portable terminals, as well as to stationary desktop personal computers and other electronic terminals.

FIG. 1 shows a block diagram of the configuration of the mobile phone of an aspect of the invention. The controller 10 controls the voice communication function, e-mail function, Internet connection function, infrared communication function, and all other functions of the mobile phone 1, and is provided with a CPU and with memory in which to store programs to be executed by the CPU. The keys 11 are input means for input of numerals and characters; the speaker 12 is voice output means; the microphone 13 is voice input means; and the display 14 is display means.

The wireless signal processing portion 15 processes signals sent to and received from an earth station via the antenna 16, and handles the signals used in voice communication, e-mail, and Internet connections.

The infrared communication unit 17 sends and receives data by infrared communications according to IrDA standards. The power supply 18 supplies power to components requiring power within the mobile phone. Standards for infrared communication are not limited to the IrDA standards, and other standards may be employed. Moreover, communication is not limited to infrared communication, if the standard provides for short-distance communication within distances of several meters.

In an aspect of the invention, when exchanging data using infrared communications with an other-party mobile phone, the controller 10 automatically switches the infrared communication unit 17 between transmission and reception, so that data exchange can be performed through a single operation of the mobile phone by the user.

Figure 2:
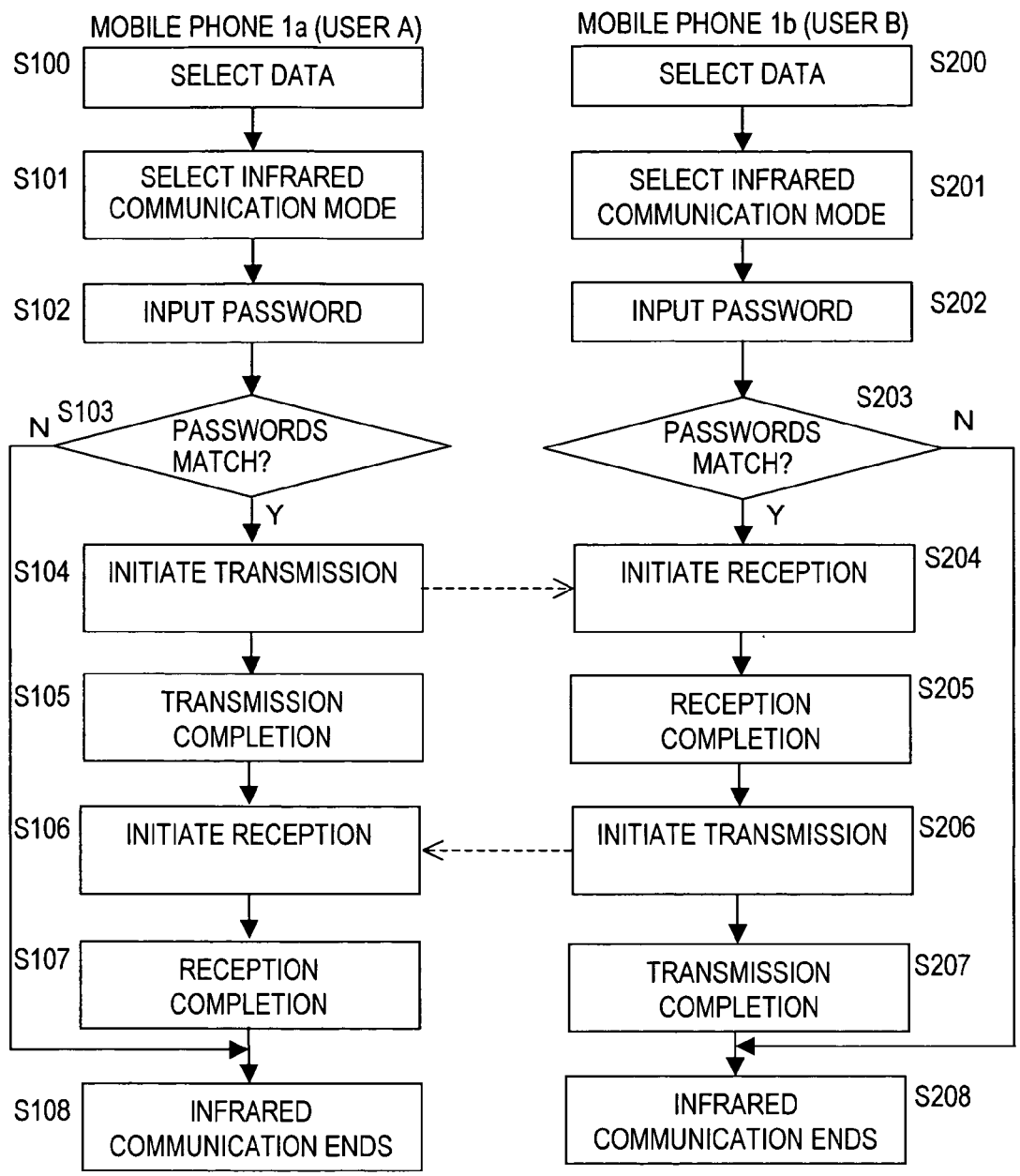
FIG. 2 is a flowchart of data exchange processing based on infrared communication in an aspect of the invention; and, FIG. 3 is an example of screens displayed on the display of a mobile phone during data exchange processing.
Figure 3:
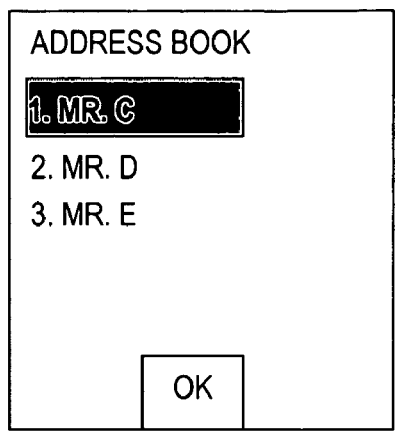
Figure 3:
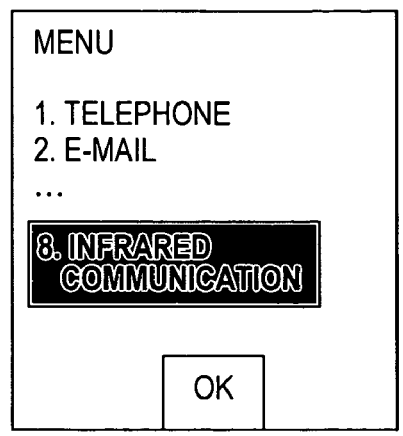
Figure 3:
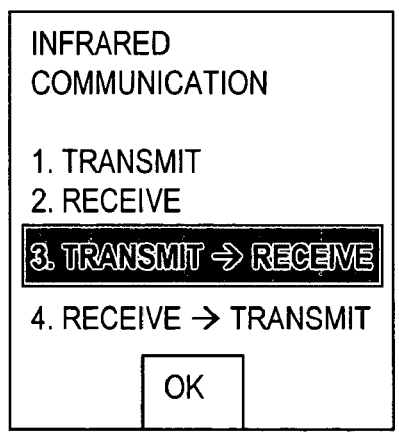
Figure 3:
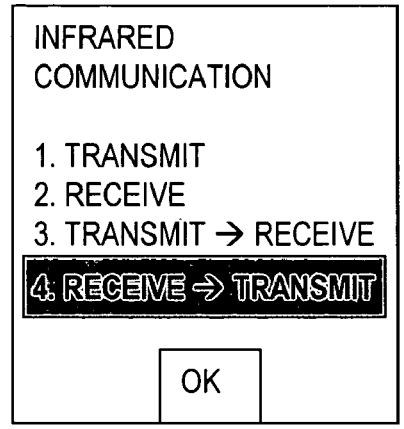
Figure 3:
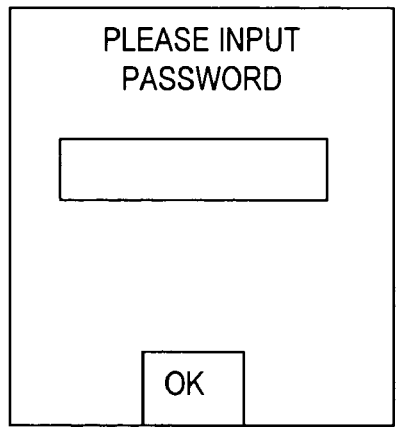

FIG. 2 is a flowchart of data exchange processing based on infrared communication in an aspect of the invention. FIG. 3 is an example of screens displayed on the display of a mobile phone during data exchange processing. An explanation is given according to FIG. 2 for an example of the exchange of address book data between the mobile phone 1a of user A and the mobile phone 1b of user B, referring to FIG. 3. The controller 10 controls infrared communication during the data exchange processing, and data is sent and received by the infrared communication unit 17 based on control by the controller 10.

User A operates the keys 11 of the mobile phone 1a to cause the address book to be displayed on the display 14, and selects an address to be transmitted (S100). User B similarly operates the keys 11 of the mobile phone 1b, causing display of the address book on the display 14, and selects an address to be transmitted (S200). In FIG. 3, (a) is an example of an address book display screen on the mobile phone 1a of user A; here "Mr. C" is selected.

Upon selecting an address to be transmitted, user A selects the infrared communication mode from the screen menu (see (b) of FIG. 3), and from the submenu selects the "transmit→receive" mode (S101) ((c) in FIG. 3). This "transmit→receive" mode is a characteristic mode of this invention, in which initially the transmission mode of transmitting data by infrared communication is entered, and after the completion of data transmission, the transmission mode and reception mode are automatically switched, and the reception mode in which data is received from the other party is entered.

Upon selecting an address to be transmitted, user B selects the infrared communication mode from the screen menu ((b) in FIG. 3), and selects the "receive→transmit" mode from the submenu (S201) ((d) in FIG. 3). This "receive→transmit" mode is a characteristic mode of this invention, in which initially the reception mode of receiving data by infrared communication is entered, and after the completion of data reception, the reception mode and transmission mode are automatically switched, and the transmission mode in which data is transmitted to the other party is entered. Switching from this transmission mode to the reception mode and from the reception mode to the transmission mode is performed automatically by the controller 10.

The "transmission" mode, for example, is simply a mode in which selected data is transmitted by infrared communication, and is not a mode in which data is received. And, the "reception" mode is simply a mode in which data is received by infrared communication, and is not a mode in which data is transmitted.

Next, users A and B each operate keys 11 to input a password (S102, S202) ((e) in FIG. 3). Passwords are determined in advance between users A and B, and user A and user B each input the same password, determined in advance. The input passwords are transmitted to the other-party mobile phone by infrared communication, and are confirmed to match. That is, the mobile phone 1a of user A confirms that the password input by user A and the password transmitted from the mobile phone 1b of user B match (S103), and the mobile phone 1b of user B confirms that the password input by user B and the password transmitted from the mobile phone 1a of user A match (S203). If there is a failure to match, infrared communication of selected data is not initiated, and processing ends (S108, S208).

If the passwords match, infrared communication of the selected data is initiated. First, the mobile phone 1a of user A is in transmission mode, and initiates transmission of data selected by user A (S104). The mobile phone 1b of user B is in reception mode, and initiates reception of data transmitted from the mobile phone 1a (S204).

Upon completing transmission of selected data (S105), the mobile phone 1a switches into receive mode to receive data, and initiates reception of data transmitted from the mobile phone 1b of user B (S106). Upon completing reception of data transmitted from the mobile phone 1a (S205), the mobile phone 1b switches into transmit mode to transmit data, and initiates transmission of data selected by user B (S206).

Upon completion of data transmission by mobile phone 1b (S207), and upon completion of data reception by mobile phone 1a (S107), infrared communication ends (S108, S208).

In this way, as is clear from the processing of S104 and beyond for mobile phone 1a and the processing of step S204 and beyond for mobile phone 1b, when infrared communication for data exchange is initiated, both data transmission and reception (or reception and transmission) are executed automatically in sequence, and both user A and user B can transmit data to the other party, and can receive data from the other party, by means of a single operation. Hence whereas two operations, which were a transmit operation and a receive operation, were required for data exchange in the prior art, by means of this invention data transmission and reception can be completed by means of a single operation before the start of infrared communication, and by this means the operation of data exchange can be simplified. Moreover, because data exchange is possible through a single operation, the time required for data exchange can be shortened.

In addition to the address book data used in the example, the data exchanged (selected data) can also be, for example, one's own profile information (one's own name, telephone number, e-mail address, and similar); image data (still image, video); music or voice data; schedule data; e-mail data, or other data which is stored in a mobile phone, or which is stored in external memory which can be removably inserted.

What is claimed is:

1. An electronic apparatus exchanging data with another electronic apparatus of the other end by using infrared communication function, comprising:
    an infrared communication unit for transmitting first data to the other electronic apparatus and receiving second data different from the first data from the other electronic apparatus by using infrared communication function; and
    a controller having a first mode of controlling the infrared communication unit to start to receive the second data when a password transmitted from the other electronic apparatus matches a password inputted to the electronic apparatus, and then to transmit the first data automatically after completion of the reception of the second data, and a second mode of controlling the infrared communication unit to start to transmit the first data when a password transmitted from the other electronic apparatus matches a password inputted to the electronic apparatus, and then to receive the second data automatically after completion of transmission of the first data.

2. A method of exchanging first data of an electronic apparatus for second data of another electronic apparatus of the other end between the electronic apparatus and the other electronic apparatus of the other end by using infrared communication function, comprising:
    causing the electronic apparatus to select a first mode of starting to receive the second data from the other electronic apparatus and then transmitting the first data to the other electronic apparatus automatically after completion of reception of the second data, or a second mode of starting to transmit the first data to the other electronic apparatus and then receiving the second data from the electronic apparatus automatically after completion of transmission of the first data;
    causing the electronic apparatus to determine whether a password transmitted from the other electronic apparatus by using infrared communication function matches a password inputted to the electronic apparatus; and
    when the both password match, causing the electronic apparatus to start to receive the second data, and then to transmit the first data automatically after completion of reception of the second data if the first mode is selected, and causing the electronic apparatus to start to transmit the first data, and then to receive the second data automatically after completion of transmission of the first data if the second mode is selected.

3. A storage medium storing a computer program exchanging first data of an electronic apparatus for second data of another electronic apparatus of the other end between the electronic apparatus and the other electronic apparatus of the other end by using infrared communication function, the computer program comprising:
    causing the electronic apparatus to select a first mode of starting to receive the second data from the other electronic apparatus and then transmitting the first data to the other electronic apparatus automatically after completion of reception of the second data, and a second mode of starting to transmit the first data to the other electronic apparatus and then receiving the second data from the electronic apparatus automatically after completion of transmission of the first data;
    causing the electronic apparatus to determine whether a password transmitted from the other electronic apparatus by using infrared communication function matches a password inputted to the electronic apparatus; and
    when the both password match, causing the electronic apparatus to start to receive the second data, and then to transmit the first data automatically after completion of reception of the second data if the first mode is selected, and causing the electronic apparatus to start to transmit the first data, and then to receive the second data automatically after completion of transmission of the first data if the second mode is selected.

* * * * *